(12) United States Patent
Machimura et al.

(10) Patent No.: US 7,930,606 B2
(45) Date of Patent: Apr. 19, 2011

(54) SELECTIVELY DEBUGGING PROCESSOR CORES THROUGH INSTRUCTION CODES

(75) Inventors: Hiroki Machimura, Kanagawa (JP); Shuichi Kunie, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 333 days.

(21) Appl. No.: 12/155,310

(22) Filed: Jun. 2, 2008

(65) Prior Publication Data

US 2008/0307193 A1  Dec. 11, 2008

(30) Foreign Application Priority Data

Jun. 5, 2007 (JP) ................................ 2007-149126

(51) Int. Cl.
*G01R 31/28* (2006.01)
(52) U.S. Cl. ........................ 714/727; 714/724
(58) Field of Classification Search .................. None
See application file for complete search history.

(56) References Cited

U.S. PATENT DOCUMENTS

| 5,526,365 | A  | * | 6/1996 | Whetsel ........................ 714/726 |
| 6,829,730 | B2 |   | 12/2004 | Nadeau-Dostie et al. |
| 7,665,002 | B1 | * | 2/2010 | White et al. .................. 714/733 |
| 2005/0257108 | A1 |   | 11/2005 | Grupp et al. |
| 2007/0226558 | A1 | * | 9/2007 | Ikeda et al. ................... 714/724 |
| 2007/0255990 | A1 |   | 11/2007 | Burke et al. |

FOREIGN PATENT DOCUMENTS

| JP | 2004-164367 | 6/2004 |
| WO | WO 02/088945 A1 | 11/2002 |
| WO | WO 2007/121330 A1 | 10/2007 |

OTHER PUBLICATIONS

European Search Report dated Dec. 22, 2008.

* cited by examiner

*Primary Examiner* — Jacob Petranek
(74) *Attorney, Agent, or Firm* — McGinn IP Law Group, PLLC (57) ABSTRACT

A semiconductor integrated circuit (chip) includes a primary TAP controller and a secondary TAP controller. The primary TAP controller interprets a bit string of n bits included in the group 1 having an m-bit length ($m \geq 2$) and less than the total number of m bits as an instruction that carries out a processing for a control object and interprets each bit string having an m-bit length as an instruction that carries out no processing for the control object. The m-bit length is obtained by adding a predetermined single bit string to each bit string included in the group 1 consisting of at least two or more bit strings having an n-bit length, respectively. The secondary TAP controller extracts a single bit string denoting an instruction that has an n-bit length and carries out no processing for the control object from each bit string interpreted by the primary TAP controller as an instruction that carries out a processing for the control object, then interprets the single bit string.

8 Claims, 8 Drawing Sheets

SELECTIVELY DEBUGGING PROCESSOR CORES THROUGH INSTRUCTION CODES

FIELD OF THE INVENTION

The present invention relates to a multicore debugging semiconductor integrated circuit that debugs plural processors, and more particularly to a semiconductor integrated circuit that connects plural JTAG ports in parallel and controls the connected cores using a switch or the like.

BACKGROUND OF THE INVENTION

In case of debugging of multiple cores, there are two mainly employed intercore JTAG connection methods; (1) serial connections (daisy chain and cascade connections) and (2) parallel switch connection (star type connection). While the serial connection is widely employed, the parallel switch connection has the following advantages; correspondable to the power-off of each CPU core, short JTAG communication route, enabling low operation frequency cores to be prevented from becoming bottlenecks and to be optimized in operation, etc.

Figure 7:
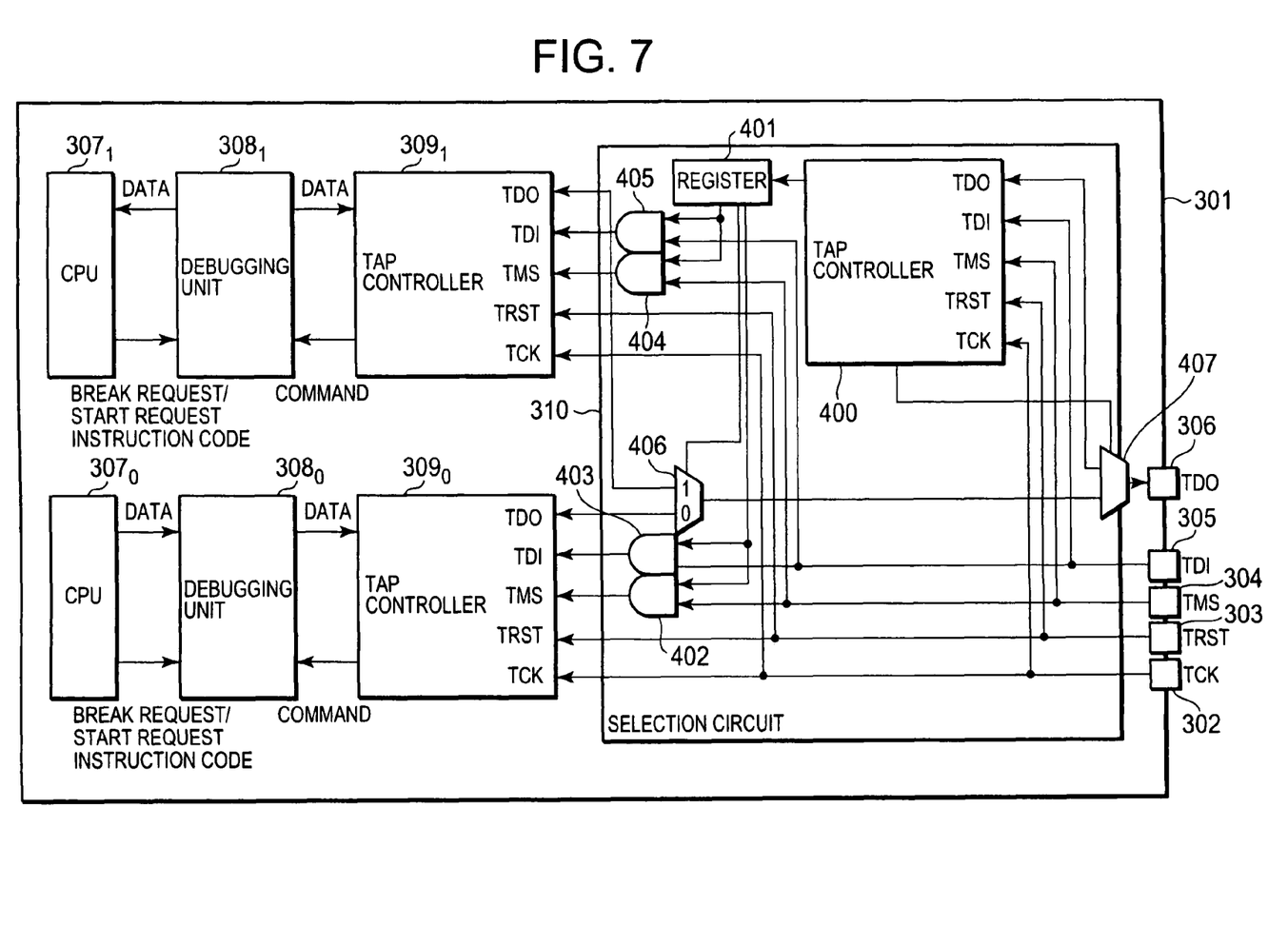
FIG. 7 is a block diagram of a multiprocessor system (LSI) that includes an object core selection control circuit in itself and employs the parallel switch connection method.

FIG. 7 shows a diagram of a multiprocessor system (LSI) including an object core selection controlling circuit in itself and employing the parallel switch connection (refer to JP-A-2004-164367). A chip 301 includes plural CPUs 3070 and 3071, as well as debuggers 3080 and 3081 that debug the CPUs 3070 and 3071. Furthermore, the chip 301 includes TAP controllers 3090 and 3091 that control the debuggers 3080 and 3081, a selection circuit 310 that selects at least one of the CPUs to be debugged, and a set of terminals including terminals 302 to 306. The CPUs 3070 and 3071 are connected to the debuggers 3080 and 3081, respectively and the debuggers 3080 and 3081 are connected to the TAP controllers 3090 and 3091, respectively. The selection circuit 310 is connected between each of the TAP controllers 3090 and 3091 and each of the terminals 302 to 306. The terminals 302 to 306 are connected to a debugger, not shown, such as an ICU or the like conforming to the JTAG standard, respectively.

The selection circuit 310 includes a primary TAP controller 400, a register 401, AND circuits 402 to 405, and selectors 406 and 407. One of the inputs of the AND is connected to the terminal 305 and the other input thereof is connected to the register 401. The output terminal thereof is connected to the TDI terminal of the TAP controller 3090, respectively. One of the inputs of the AND circuit 404 is connected to the terminal 304 and the other input thereof is connected to the register 401. The output terminal thereof is connected to the TMS terminal of the TAP controller 3091. And one of the inputs of the AND circuit 405 is connected to the terminal 305 and the other input thereof is connected to the register 401. The output terminal thereof is connected to the TDI terminal of the TAP controller 3091. One of the input terminals of the selector 406 is connected to the TDO terminal of the TAP controller 3090 and the other input terminal thereof is connected to the TDO terminal of the TAP controller 3091 and the output terminal thereof is connected to the terminal 306 through the selector 407.

In this configuration, the selection circuit 310 selects the CPU 3070 or 3071 to be debugged under the control of the primary TAP controller 400. The primary TAP controller 400 is kept connected to a JTAG signal in operation. Each of the TAP controllers 3090 and 3091 operates a TAP controller specified according to the select signal generated by the primary TAP controller 400.

Inn this case, the primary TAP controller 400 specifies the multicore extension register 401 according to the signal from the IR register (instruction register). Then, the primary TAP controller 400 sets a value in the extension register 401 through a DR register to debug either or both of the CPUs 3071 and 3072. Consequently, the CPU 3070 or 3071 is selected for debugging or both of the CPUs 3070 and 3071 are debugged simultaneously.

SUMMARY

In case of the chip 301 described in JP-A-2004-164367, however, it is required that each of the TAP controllers 3090 and 3091 assigns an unused code as the IR code to be inputted to the primary TAP controller 400 to specify the extension register 401. Hereinafter, this IR code will be referred to as an IR code for selection. The IR code for selection is also inputted to the specified TAP controller 3090/3091. This is why the IR code must be an unused one in the TAP controller 3090/3091. Otherwise, the TAP controller 3090/3091 might malfunction.

In order to configure a chip 1 newly in this case, it is just required to determine the IR code for selection to be used by the primary TAP controller 400 separately from the IR codes used by the TAP controller 3091/3092. However, upon connecting an existing processor core (CPU, debugger, TAP controller) that includes a TAP controller newly to the selection circuit 310, a problem will arise.

Hereunder, there will be described this problem. In case of the IEEE1149.1 standard, neither binary codes nor its code sizes (bit lengths) are specified for the JTAG IR codes except for the bypass register access (bypass instruction) binary code. The bypass register access binary (IR) code is ruled so that all the bits therein are "1" ($\{m\{1'b1\}\}$: m=IR code size) regardless of its code size. No rule is set for other instruction codes. In a TAP controller included in an existing processor core, therefore, sizes and binary codes to be applied for the IR codes differ among processor cores. As LSIs are scaled up and the number and types of processors to be included therein are increasing and furthermore while the IR codes are different among processors, it is very difficult to find unused codes.

Furthermore, there might be a case in which an illegal different size IR code is inputted to a TAP controller and regarded as an illegal one, thereby the TAP controller malfunctions.

Next, there will be described this problem with reference to FIGS. 8A to 8D. Assume here that a multicore extension IR code is inputted to the primary TAP controller and to the subject processor core secondary TAP controller, respectively. FIGS. 8A to 8D show how the states of the IR shift registers in the first and secondary TAP controllers will be changed upon the input of such an IR code. It is premised here that the IR code size of the secondary TAP controller is 4 bits while that of the primary TAP controller is 5 bits. It is also premised here that the subject LSI includes another processor, not shown, other than the processor A and the maximum length of the IR codes is 5 bits in the TAP controller. Therefore, the IR code size in the primary TAP controller is also assumed to be determined as 5 bits.

Figure 8A:
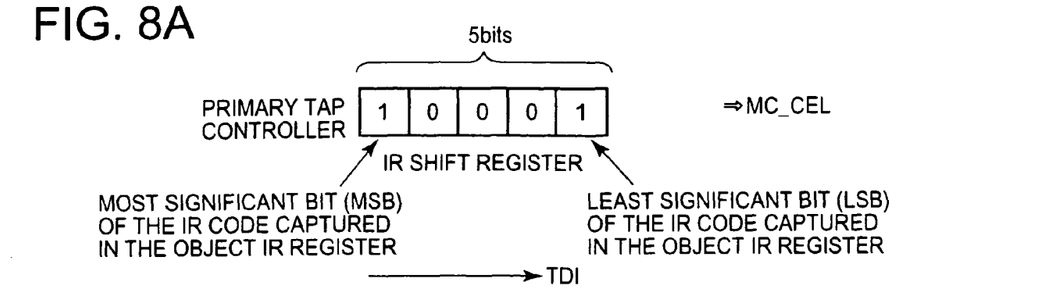
FIG. 8A is an example of mapping of a multicore extension register and an IR code of the primary TAP controller.
Figure 8B:
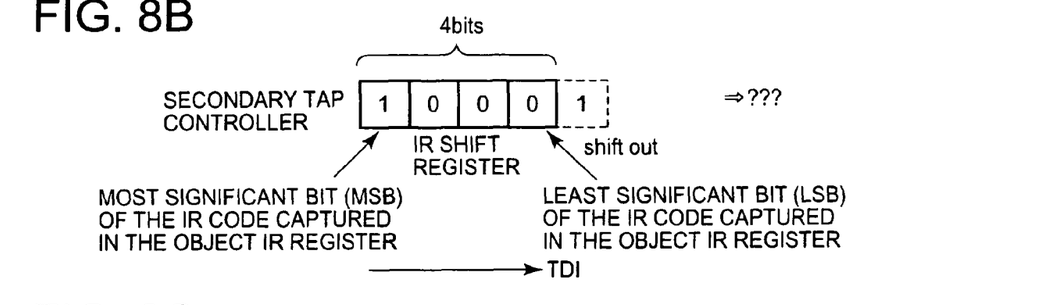
FIG. 8B is another example of the mapping of the multicore extension register and the IR code of the primary TAP controller.

If the selection of the processor core B is required while the secondary TAP controller is selected and the IR code size is determined as described above, a 5-bit MC_SEL (10001) code is inputted to the IR shift register of the primary TAP controller as shown in FIG. 8A, At this time, the IR code shift register is assumed to input the IR binary code bit by bit sequentially from the least significant bit (from the left in FIGS. 8A to 8D) and shift those inputted bits to the right. At this time, the IR code is inputted to the IR shift register of the currently selected secondary TAP controller. In this example, the IR code size of the processor A is 4 bits. If a 5-bit IR code is inputted, as shown in FIG. 8B, the least significant bit is shifted out and the processor A recognizes the IR code as a "1000" instruction. If this "1000" IR code is used as an IR code in the secondary TAP controller, therefore, it is recognized as an instruction; thereby, the secondary TAP controller might malfunction.

Figure 8C:
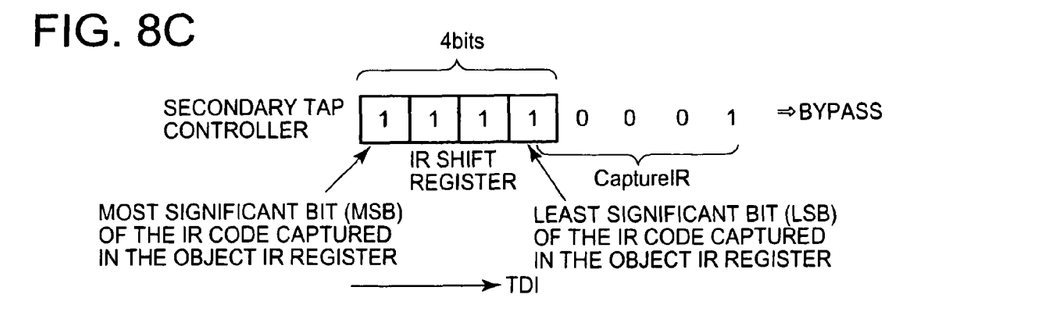
FIG. 8C is still another example of the mapping of the multicore extension register and the IR code of the primary TAP controller.
Figure 8D:
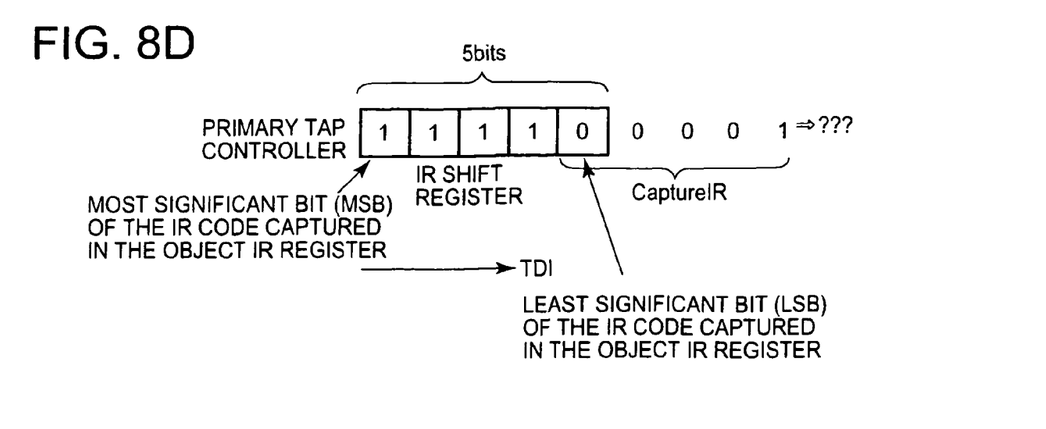
FIG. 8D is still another example of the mapping of the multicore extension register and the IR code of the primary TAP controller.

On the other hand, if an IR code is inputted from a debugger to the secondary TAP controller, the IR code is also inputted to the primary TAP controller. This is because the primary TAP controller is kept connected to the debugger. As shown in FIG. 8C, the IR shift register is ruled by the IEEE1149.1 standard so as to input any bit string if the lower-order 2 bits are 2'b01 when the IR shift register's initial TAP state is Capture IR before the shifting begins. However, the bit value of the bit string is not ruled in the standard. The bit value is assumed to be 0 here. The IR code size of the secondary TAP controller is 4 bits as shown in FIG. 8D. The 5 bits of the primary TAP controller are not filled completely. Thus the least significant bit becomes 0 as shown in FIG. 8C. At this time, if the IR code is also used in the primary TAP controller, it is recognized as an instruction in the primary TAP controller as described above. And to avoid the malfunction of the primary TAP controller, therefore, it is required to assure that the IR code is not used in the primary TAP controller.

Upon determining any IR code to be used in the primary TAP controller, it is required to assure that the IR code is not recognized wrongly in the subject processor core TAP controller. Furthermore, if an IR code used in the subject processor core TAP controller is to be inputted to the primary TAP controller, the IR code is required to be prevented from wrong recognition that might otherwise occur in the primary TAP controller.

If consideration is taken to the diversion of the primary TAP controller, it is required to determine the IR codes of the primary TAP controller so as to satisfy this condition (diversion) even in any processor core to be connected in the future. In such a way, no conditions have been determined for the JTAG IR codes used in each processor core TAP controller except for the bypass register access one. IR codes having completely different sizes have been used among processors so far. Consequently, it is required to determine such IR codes properly so as to prevent malfunctions that might otherwise occur in the primary TAP controller 400, as well as in the TAP controllers 3090 and 3091.

The semiconductor integrated circuit according to an aspect of the present invention includes a primary controller and a secondary controller. The primary controller interprets the number of bit strings included in a first bit string group consisting of at least two or more bit strings having a first bit length, respectively and less than the total number of bit strings in the first bit string group as instructions that carry out processings for control objects, respectively. The primary controller also interprets each bit string having the first bit length obtained by adding a single predetermined bit string to each bit string in a second bit string group consisting of at least two or more bit strings having a second bit length that is shorter than the first bit length, respectively as an instruction that carries out no processing for the control object. The secondary controller interprets each bit string included in the second bit string group as an instruction that carries out a processing for a control object. The secondary controller also extracts a single bit string having the second bit length and denoting an instruction that carries out no processing for the control object from each bit string interpreted by the primary controller as an instruction that carries out a processing for the control object, then interprets the extracted bit string.

In case of an aspect of the present invention, because the primary controller interprets each bit string having a first bit length obtained by adding a single predetermined bit string to each bit string included in the second bit string as an instruction that carries out a processing for the control object and the secondary controller interprets each bit string included in the second bit string group as an instruction and extracts a single bit string having the second bit length and denoting an instruction that carries out no processing for the control object from each bit string interpreted by the primary controller as an instruction that carries out a processing for the control object, then interprets the extracted bit string, the first and secondary controllers make no interference with each other with respect to any instructions.

According to an aspect of the present invention, therefore, it is possible to provide a semiconductor integrated circuit capable of preventing malfunctions in a multicore system that uses two or more types of TAP controllers.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereunder, there will be described a concrete embodiment of the present invention in detail with reference to the accompanying drawings. In this embodiment, the present invention is applied to a multicore debugging system (debugging circuit) configured so as to connect JTAG TAP controllers of processor cores in parallel and enable another JTAG TAP controller (primary TAP controller) to control the switching among selection signals for those JTAG TAP controllers.

In this embodiment, the primary TAP controller uses IR codes extended from bypass register access codes: all bits "1" {m(1'b1)} (m: the maximum IR code length of the subject processor core). Consequently, the TAP controller of each processor core recognizes the IR codes of the primary TAP controller as IR codes for bypass register accesses. Each circuit can thus be prevented from malfunctions, thereby realizing a multicore debugging system configured with simple circuits and with less circuit overheads. The system therefore comes to be excellent in flexibility and expandability.

Figure 1:
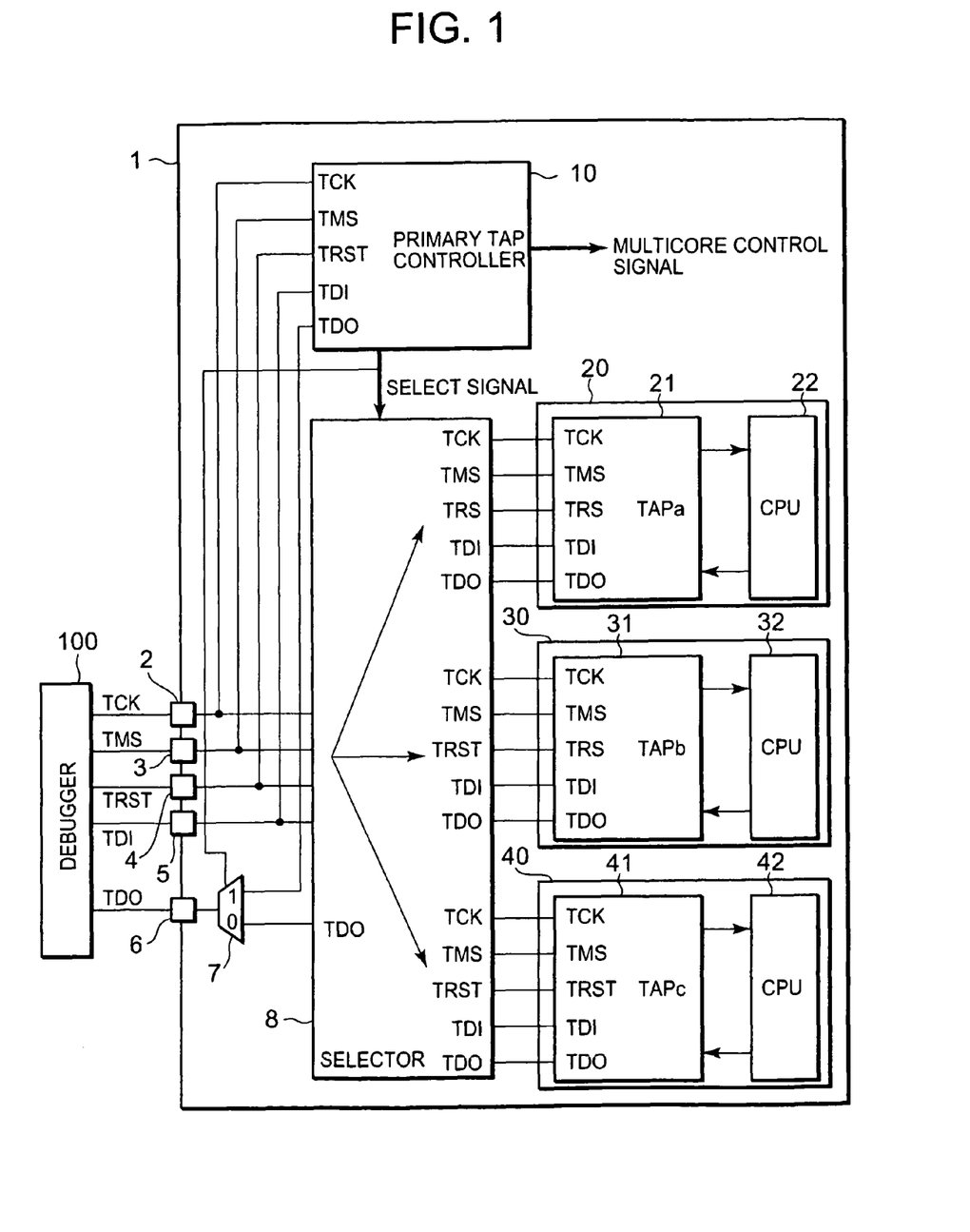
FIG. 1 is a block diagram of a multicore debugging system in an embodiment of the present invention.

FIG. 1 shows a block diagram of the multicore debugging system in this embodiment of the present invention. A chip 1 includes terminals 2 to 6 connected to a debugger 100 such as an ICE; a primary TAP controller 10; selectors 7 and 8; processor cores 20, 30, and 40. The selector 8 selects a TDO signal received from the primary TAP controller 10 or selector 7 and outputs the TDO signal to the destination.

The primary TAP controller 10 is kept connected to the debugger 100; thereby, it can be controlled by the debugger 100. The primary TAP controller 10 interprets the number of bit strings included in a first bit string group consisting of at least two or more bit strings having a first bit length of, for example, 6 bits, respectively and less than the total number of bit strings in the first bit string group as instructions that carry out processings for a control object (selector 8), respectively. Furthermore, the primary TAP controller interprets each bit string having a bit length of 6 bits obtained by adding a single predetermined bit string, for example, "00" to each bit string included in a second bit string group consisting of at least two or more bit strings having a second bit length of, for example, 4 bits that is shorter than the first bit length, as an instruction that carries out no processing for the selector 8.

The selector 8 is a circuit controlled according to the control signals received from the primary TAP controller 10. The selector 8 connects the primary TAP controller 10 to any one of the debugger 100 and the processor cores 20, 30, and 40 according to the received control signal.

The processor cores 20, 30, and 40 are connected to the selector 8 in parallel and they have the same configuration. For example, the processor core 20 includes a TAP controller (hereinafter, to be referred to as the secondary TAP controller) 21 and a CPU 22 to be debugged by this secondary TAP controller 21. The processor core 30/40 includes a secondary TAP controller 31/41 and a CPU 32/42.

The secondary TAP controller 31 interprets each bit string included in the second bit string group as an instruction. Furthermore, the secondary TAP controller 31 extracts a 4-bit single bit string denoting an instruction that carries out no processing for the selector 7 from each bit string included in the first bit string group and interpreted by the primary TAP controller 10 as an instruction that carries out a processing for the CPU 32, then interprets the extracted bit string.

This chip 1 selects a core to be debugged by the primary TAP controller 10. The primary TAP controller 10 then operates the secondary TAP controller of a single processor core kept connected to the JTAG terminal signal and validated.

Figure 2:
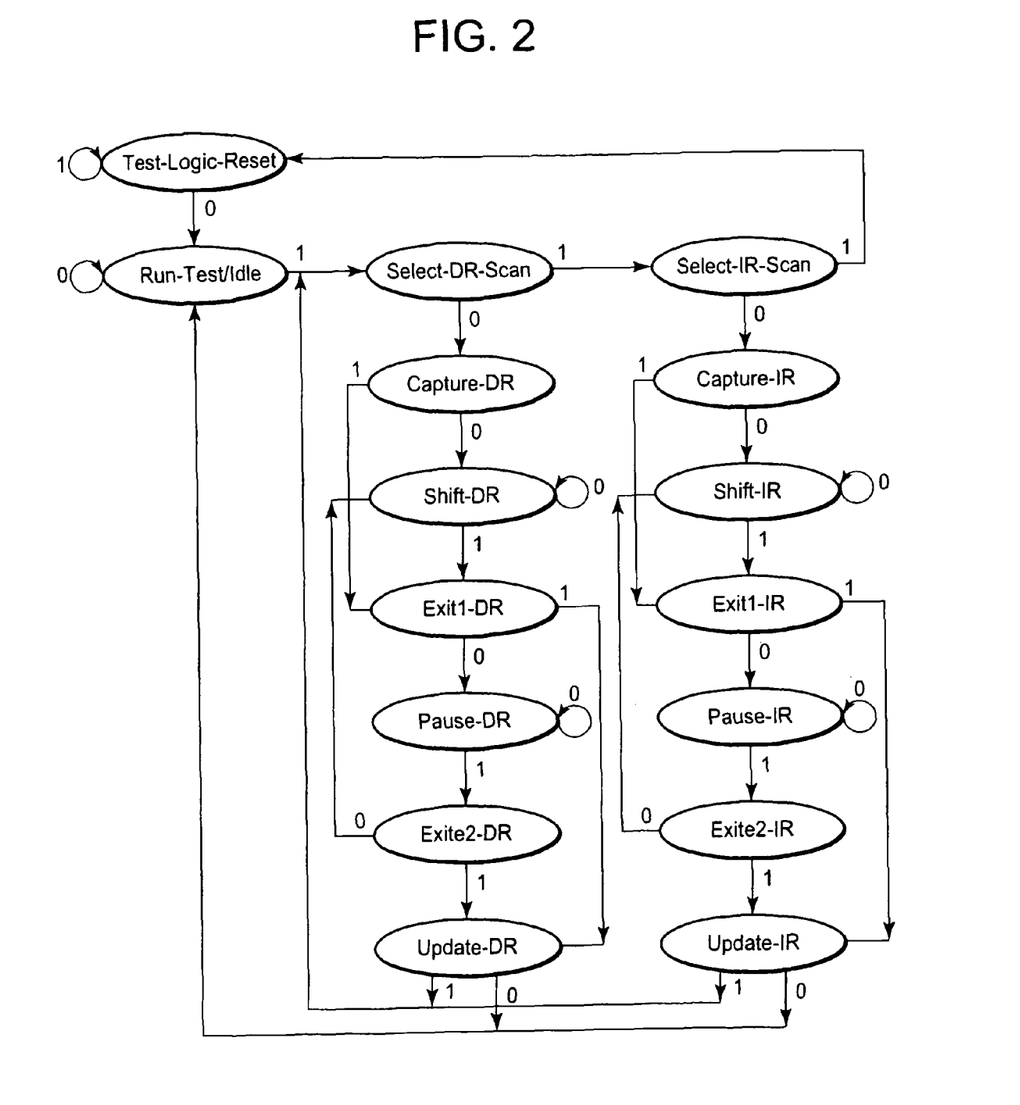
FIG. 2 is a diagram that shows the states of a TAP controller 16.

Next, there will be described the states of the TAP controllers briefly. FIG. 2 shows the 16 states of a TAP controller. The state transition occurs only at a rising edge of the TCK terminal. Each TAP controller includes an IR shift register, an IR register (instruction register), a DR shift register, and a DR register (data register). The DR register operates in a state ending with the DR shown in FIG. 2 and the IR register operates in a state ending with the IR shown in FIG. 2. Hereunder, a description will be made for the operation of the TAP controller in each of such states.

In the state of Test-Logic-Reset, all the test logics are disabled and the normal operation of the subject IC is enabled. The TAP controller state machine is designed so as to set the state of Test-Logic-Reset by driving the TMS terminal to the high level and generating the TCK signal five times regardless of the initial state of the controller. Consequently, the test reset (TRST) pin is optional. Among the JTAG signals output from the subject debugger, the TMS signal denotes the state transition direction in the state machine with its value "0" or "1". The TMS signal is captured into the TAP state machine to be described later in accordance with the rising of the TCK signal and accordingly the state machine makes a state transition.

In the state of Run-Test-Idle, the test logics in the subject IC are activated only upon a specific instruction. In other cases, the test logics in the IC are idle.

In the state of Select-DR-Scan, the controller selects either the state of Data-Path or the state of Select-IR-Scan.

In the state of Select-IR-Scan, the controller selects whether to go to an instruction path. If not going, the controller returns to the state of Test-Logic-Reset.

In the state of Capture-IR, the shift register included in the subject IR register reads a fixed value pattern in parallel at the rising edge of the TCK terminal. In the fixed value, "1" is set for the least significant bit (LSB) and "0" is set for all other bits.

In the state of Shift-IR, data is captured into the IR shift register 106 from the TDI terminal and shifted at each rising time of the TCK terminal.

In the state of Exit1-IR, the controller determines setting either the state of Pause-IR or the state of Update-IR.

In the state of Pause-IR, the shifting by the IR shift register can be suspended temporarily.

In the state of Exit-DR, the controller determines setting either the state of Shift-IR or the state of Update-IR.

In the state of Update-IR, the controller transfers the instruction set in the IR shift register to the IR register. This instruction, once it is stored in the IR register, is assumed as the current instruction.

In the state of Capture-DR, the current instruction selected by the DR shift register is set in the DR register in parallel at the rising time of the TCK terminal.

The states of Shift-DR, Exit1-DR, Pause-DR, Exit2-DR, and Update-DR are the same as the states of Shift-IR, Exit1-IR, Pause-IR, Exit2-IR, and Update-IR of the instruction path.

Figure 3:
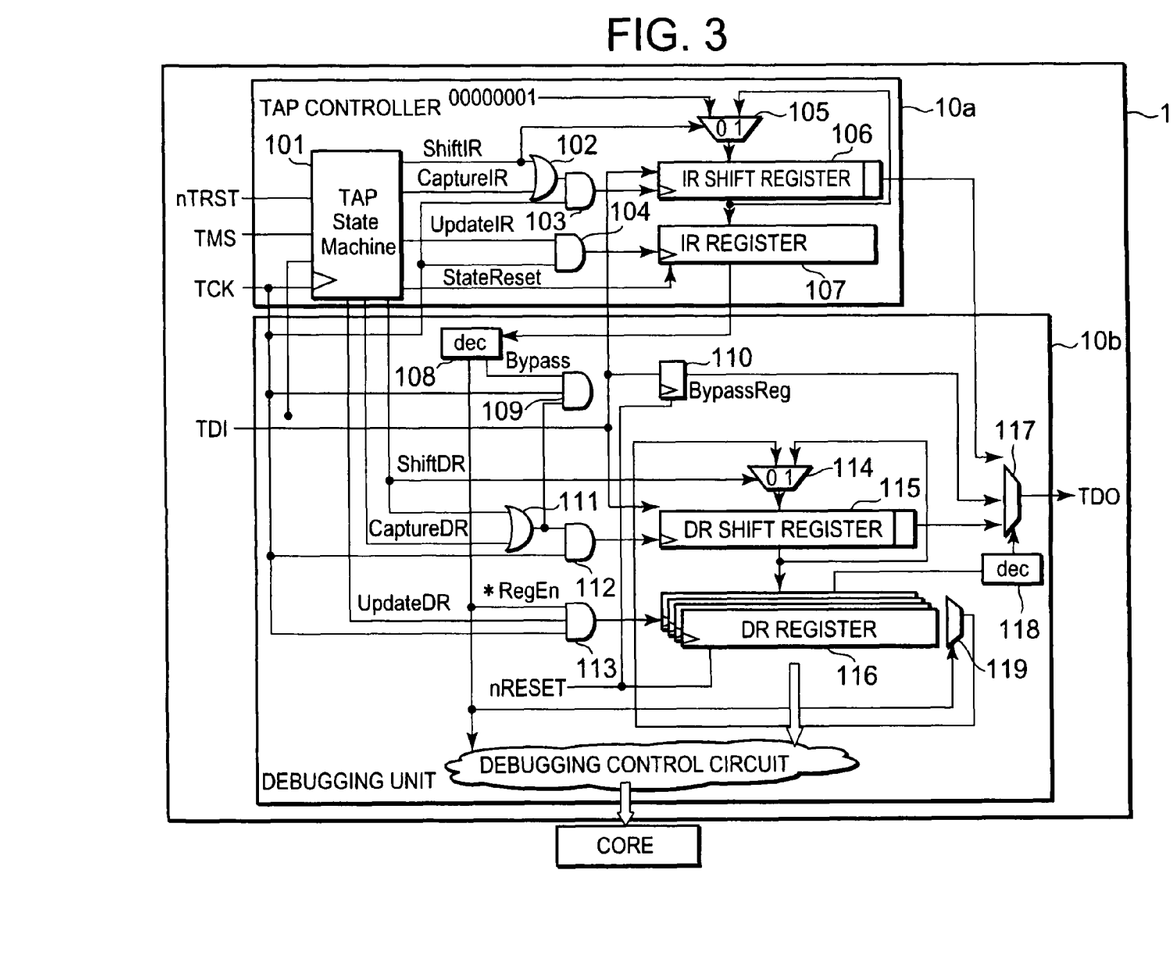
FIG. 3 is a block diagram of the TAP controller.

Next, there will be described a TAP controller. FIG. 3 shows a block diagram of the TAP controller. The configurations of the primary and secondary TAP controllers are the same as that of this TAP controller. This configuration is that of general TAP controllers. Here, the TAP controller is assumed to be the primary TAP controller 10.

The primary TAP controller 10 includes a TAP controller 10a and a debugger 10b. The TAP controller 10a includes a TAP state machine 101, an OR circuit 102, AND circuits 103 and 104, a selector circuit 105, an IR shift register 106, and an IR register (instruction register) 107. The debugger 10b includes an OR circuit 111, AND circuits 109, 112, and 113, selectors 114, 117, and 119, a bypass register 110, a DR shift register 115, a DR register 116, decoders 108 and 118.

The TAP state machine 101 inputs signals of nTEST, TMS, TCK, and TDI and controls each of the above-described states of the TAP controller. The state of the TAP controller is thus switched among the states of ShiftIR, CaptureIR, UpdateIR, StateReset, ShiftDR, CaptureDR, and UpdateDR. In the state of ShiftIR, the IR shift register 106 shifts object data, which is then captured into the IR register 107 at the timing of the UpdateIR.

If the instruction stored in this IR register is for a bypass access, the subject data is output through the bypass register 110. And according to the instruction stored in the IR register 107, one of the DR registers 116 is selected. When the instruction is captured into the DR shift register 115 in the state of CaptureDR, the instruction is output bit by bit as TDO through the selector 117.

In this embodiment, each IR code inputted to the primary TAP controller from the debugger 100 does not interfere with any IR code inputted from the debugger to the secondary TAP controller in a processor core, so that the IR code is long.

Next, there will be described the IR codes of this primary TAP controller. As described above, the primary TAP controller 10 outputs control signals according to the IR codes inputted from the debugger 100, respectively. The selector 8 is connected to either the debugger 100 or the secondary TAP controller according to such a control signal. The IR code inputted to the primary TAP controller at this time is referred to as an IR code for selection. In other words, the primary TAP controller interprets this IR code for selection as an instruction that connects the selector 8 to any one of the secondary TAP controllers 20, 30, and 40. This IR code for selection is obtained by extending a bypass register access code that is a specific IR code of the secondary TAP controller. Concretely, if the maximum length of the IR codes of the secondary TAP controller is "m" bits (m≧1 (integer)), the IR code for selection of the primary TAP controller comes to consist of m+n bits (n≧2 (integer) and the upper-order m-bit string is assumed as an IR code (all bits "1") for a bypass register access (bypass instruction) of the secondary TAP controller.

This means that the upper-order m-bit string in the bit string of the IR code for selection denotes an instruction that disables the secondary TAP controller's processing for the control object, which is a single CPU. Furthermore, the lower-order n-bit string in the IR code for selection is not a predetermined bit string. For example, if the primary TAP controller that interprets a bit string consisting of m+n bits obtained by adding n bits to the m bits as an instruction after receiving an m-bit bit string, the primary TAP controller regards the n bits added to the m bits as a predetermined bit string. For example, in case of the description for the operation of this embodiment to be described later, the primary TAP controller that interprets each 6-bit string as an instruction receives 4-bit strings. In this case, among the bit strings inputted to the primary TAP controller in the state of CaptureIR, the lower-order 2 bits "00" left over finally in the IR shift register is assumed as a predetermined bit string. Furthermore, if an instruction conforming to the JTAG standard is assigned to a bit string just like in this embodiment, a bit string consisting of n bits that are all "1" is also assumed as the predetermined bit string. This is because all the m+n bits are "1" if all the upper-order m bits are "1" and all the lower-order n bits are "1" and a bit string consisting of m+n bits that are all "1" becomes a bypass instruction conforming to the JTAG standard. In such a way, each bit string in which the upper-order m-bit string denotes an instruction according to which the secondary TAP controller does not carry out any processing for the control object and the lower-order n-bit string is not the predetermined bit string is assumed as an IR code for selecting the primary TAP controller, and generally it is assumed as an instruction that carries out no processing for the control object.

Each bit string other than the one to which the above-described IR code for selection is assigned is assumed as an instruction according to which the primary TAP controller carries out no processing for the selector 8. And each bit string having a length of m+n bits (n≧2 (integer)) among which all the upper-order m bits are not "1" is assumed as an instruction according to which the primary TAP controller carries out no processing for the selector 8. For example, if the JTAG standard is employed just like in this embodiment, such a bit string can be assumed as a bypass instruction. Furthermore, even when all the upper-order m bits are "1", if the string of the lower-order n bits is the predetermined bit string, the bit string is assumed as an instruction according to which the primary TAP controller carries out no processing for the selector 8. In case of the JTAG standard, such an instruction can be a bypass instruction similarly.

Figure 4:
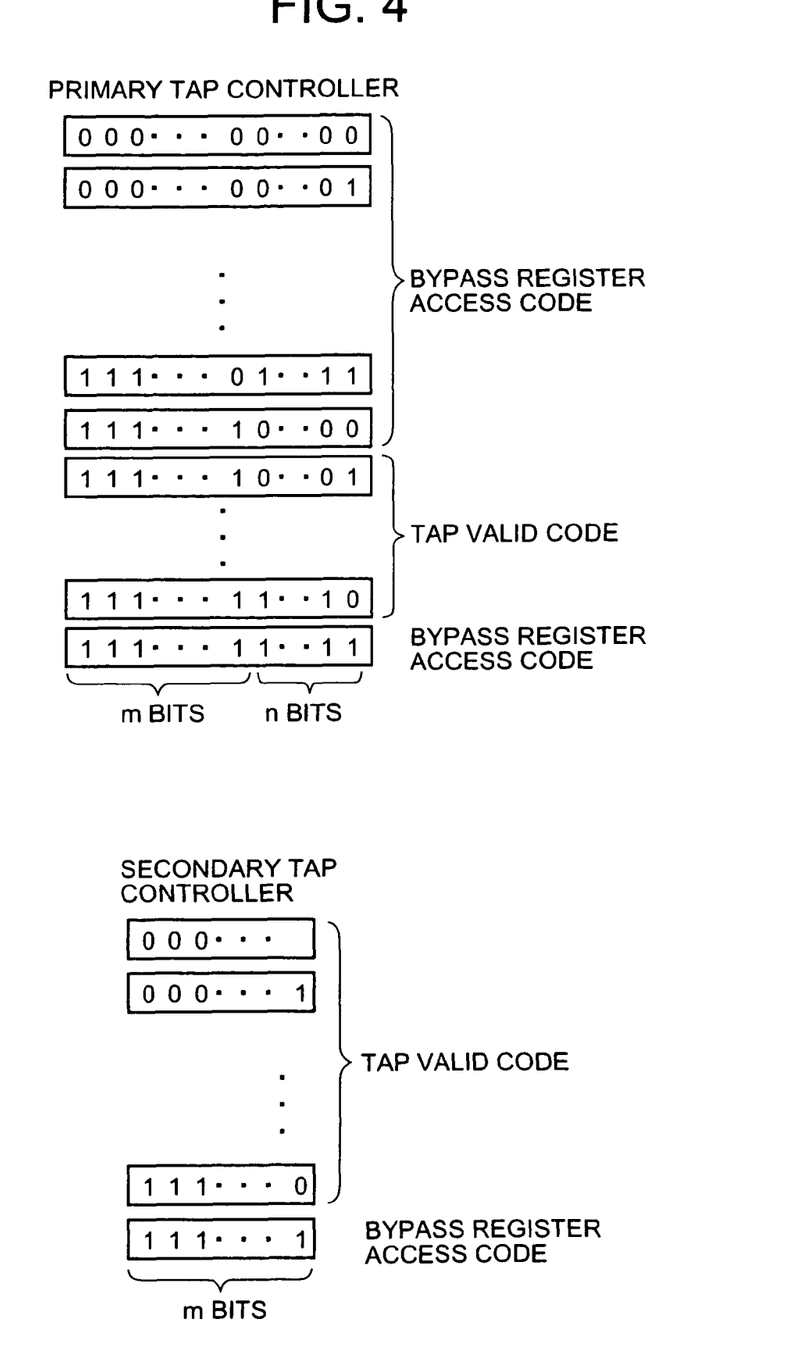
FIG. 4 is examples of IR codes in the embodiment of the present invention.

The upper half of FIG. 4 shows the correspondence between an instruction interpreted by the primary TAP controller and each bit string included in a bit string group consisting of bit strings having a length of m+n bits, respectively. The lower half of FIG. 4 shows the correspondence between an instruction interpreted by the secondary TAP controller and each bit string included in a bit string group consisting of bit strings having a length of m bits, respectively. In the upper half of FIG. 4, a bit string consisting of the upper-order m bits is a bypass instruction according to which the secondary TAP controller carries out no processing for the control object and the bit string consisting of m+n bits, in which the bit string of the lower-order n bits is not a predetermined bit string, is assumed as a valid TAP code. For example, the valid TAP code can be assumed as the above-described IR code for selection. As described in the upper-half of FIG. 4, a bit string consisting of n bits of "0" only or consisting of n bits of "1" only is assumed as the predetermined bit string. Furthermore, a bit string consisting of m+n bits in which all the upper-order m bits are not "1" and a bit string consisting of m+n bits in which all the upper-order m bits are "1" while the bit string of the lower n bits is the predetermined bit string is assumed as a bypass instruction.

At first, the debugger 100 sends an IR code to the primary TAP controller. The IR code is a bit string assumed as a valid TAP code and consists of m+n bits. The debugger 100 also sends an IR code to the secondary TAP controller. The IR code is a bit string included in a bit string group consisting of bit strings having a length of m bits, respectively as shown in the lower half of FIG. 4. Hereunder, there will be described the concrete operations of the primary and secondary TAP controllers to be made upon receiving an IR code consisting of m+n bits or m bits from the debugger 100, respectively.

Figure 5A:
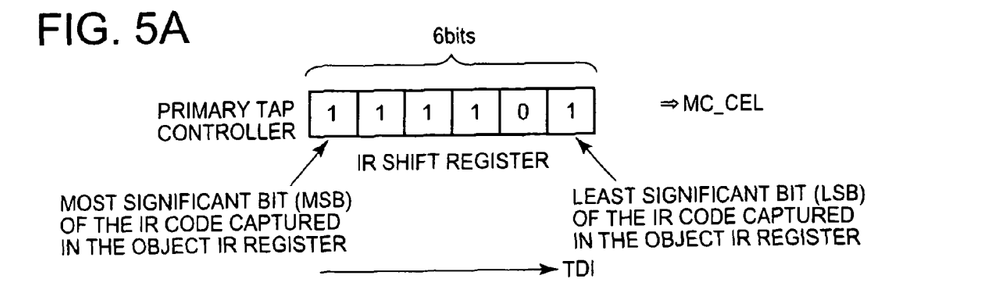
FIG. 5A is an example of an IR code used by a primary TAP controller in the embodiment of the present invention.

FIGS. 5A to 5D shows concrete examples of IR codes received and interpreted by those primary and secondary TAP controllers. In FIGS. 5A to 5D, "m" and "n" shown in FIG. 4 are assumed as "4" and "2", respectively. For example, the maximum IR code length "m" interpreted by the secondary TAP controller in an object processor core is 4 bits, so that 6'b111101 is assumed as the IR code for selecting the processor core of the primary TAP controller 10 (core select). If the object processor core is switched from the processor core 20 to the processor core 30, the debugger 100 sends the IR code for selection 6'b111101 to the anytime accessible primary TAP controller 10 as shown in FIG. 5A. The primary TAP controller 10 writes the received IR code for selection 6'b111101 in the IR register in the state of UpdateIR and sends the corresponding control signal to the control object, that is, the selector 8. The selector 8 then selects the processor core 30. Hereinafter, the state machine of the secondary TAP controller of the processor core 20 stops in the state of Idle.

Figure 5B:
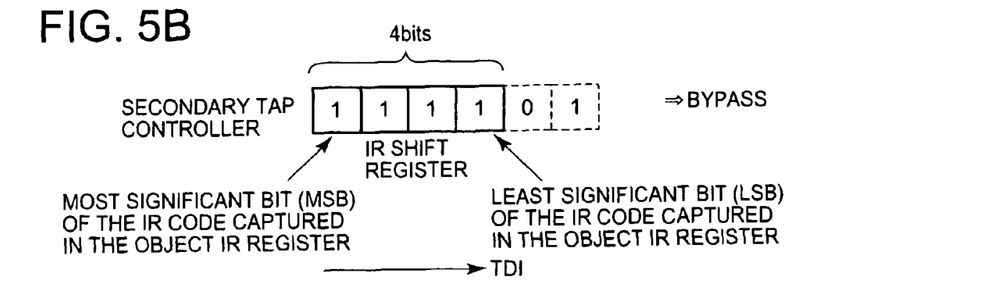
FIG. 5B is an example of another IR code used by the primary TAP controller in the embodiment of the present invention.

On the other hand, the above-described IR code for selection is also inputted to the secondary TAP controller 21 of the processor core 20. However, because the maximum IR code length of the secondary TAP controller of the processor core 20 is 4 bits, the lower-order two bits in the 6-bit IR code for selection inputted to the secondary TAP controller 21 are shifted out as shown in FIG. 5B. Consequently, the 4'b1111 that is the upper-order 4 bits in the above-described IR code for selection is written in the IR register in the state of UpdateIR. In this case, the secondary TAP controller 21 executes the bypass instruction.

This means that the secondary TAP controller 21 that interprets 4-bit IR codes comes to extract the bit string of 4 bits denoting the bypass instruction from the 6-bit IR code for selection and interprets the selected IR code. Consequently, if a 6-bit IR code for selection is inputted to the primary TAP controller, the secondary TAP controller can be prevented from carrying out a processing for the control object, that is, the CPU 22.

The JTAG IEEE1149.1 standard prescribes a rule that an IR code, if all the bits therein are "1", is assumed as a bypass register access instruction regardless of the code size. Consequently, the processor core 20 accesses the bypass register 110 shown in FIG. 3. In other words, it is assured that any other JTAG instructions are not executed.

Figure 5C:
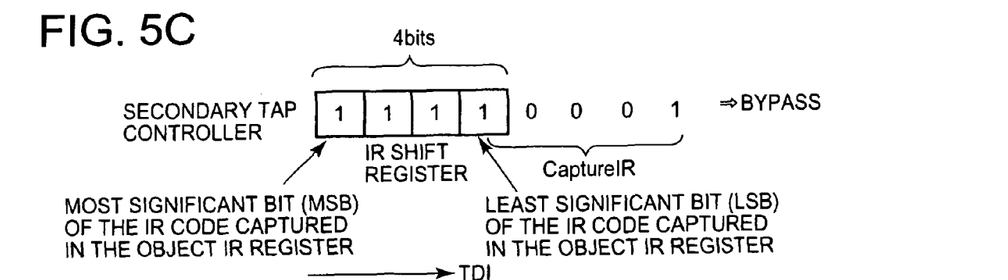
FIG. 5C is an example of still another IR code used by the primary TAP controller in the embodiment of the present invention.
Figure 5D:
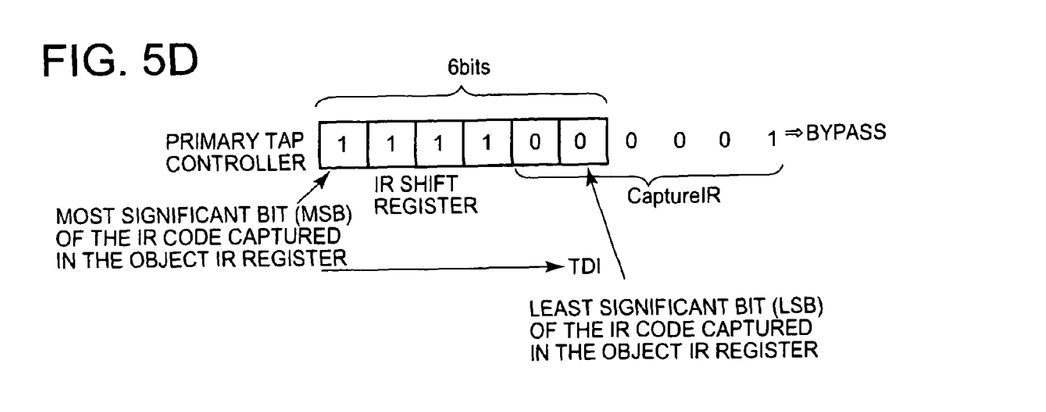
FIG. 5D is an example of still another IR code used by the primary TAP controller in the embodiment of the present invention.

If a 4-bit IR code is inputted to any secondary TAP controller included in the processor core 20/30/40, the 4-bit IR code is also inputted to the primary TAP controller 10. This is because the controller 10 is kept connected to the debugger. In this case, in each of the processor cores 20, 30, and 40, the IR code size is 4 bits or under while the IR code size in the primary TAP controller 10 is 6 bits. Thus the IR register is not filled completely. And in such a case, in this embodiment, for example, in accordance with the IEEE1149.1 standard, 6'b000001 is inputted to the IR shift register of the primary TAP controller 10 in the state of CapctureIR before IR shifting. Consequently, if any secondary TAP controller included in the processor core 20/30/40 inputs the bypass access code 4'b1111 as an IR code as shown in FIG. 5C, the lower-order 2 bits 2'b0 is assured in the IR code stored in the IR shift register of the primary TAP controller 10 as shown in FIG. 5D. Among the 6-bit instructions interpreted by the primary TAP controller 10, therefore, no instruction that carries out a processing for the selector 8 is assigned to any IR code in which the lower-order 2 bits are "00". Instead, for example, a bypass access code is assigned to such an IR code. If the primary TAP controller 10 inputs an instruction interpreted by any secondary TAP controller included in the processor core 20/30/40, the primary TAP controller 10 carries out no processing for the selector 8, which is the control object and comes to recognize the instruction as a bypass register access instruction. Furthermore, even when a secondary TAP controller included in any of the processor cores 20, 30, and 40 inputs a bit string other than the bypass access code 4'b1111, the primary TAP controller 10 recognizes the bypass register access instruction. This is because the primary TAP controller 10, as shown in the example in FIG. 4, recognizes each bit string in which all the upper-order 4 bits are not "1" among the 6-bit bit strings recognized as IR codes, respectively as a bypass register access instruction.

The IEEE1149.1 standard rules that the lower-order 2 bits must be 2'b01 in each value inputted to each IR register in the state of CaptureIR. Other bits in the value are free from the rule. In this embodiment, in the primary TAP controller 10, any bits other than these lower-order 2 bits are all "0" or "1". If all the bits are "0" and if the lower-order 2 bits are "00" in the primary TAP controller 10 as described above, it is just required not to assign any specific instruction to the bit string of those bits. If all the bits in the value are "1", the lower-order 2 bits are assured to be 2'b11. Consequently, the primary TAP controller 10 always recognizes the bit string of those bits as a bypass register access instruction.

Even when a new processor core is to be added here, if the IR code size of the TAP controller included in the added processor core does not exceed m bits, the IR codes of the primary TAP controller 10 can be used as are. Furthermore, if the IR codes of the primary TAP controller 10 are determined beforehand by taking consideration to the expandability and accordingly by taking consideration to the IR code size that will increase up to a certain degree, the diversion property will increase more.

And because the TAP controller according to an aspect of the present invention can also correspond to different IR codes, some of the employed JTAG connections may be replaced with serial connections.

Furthermore, the system can be expanded hierarchically by configuring a similar system in the upper hierarchical layer.

Figure 6:
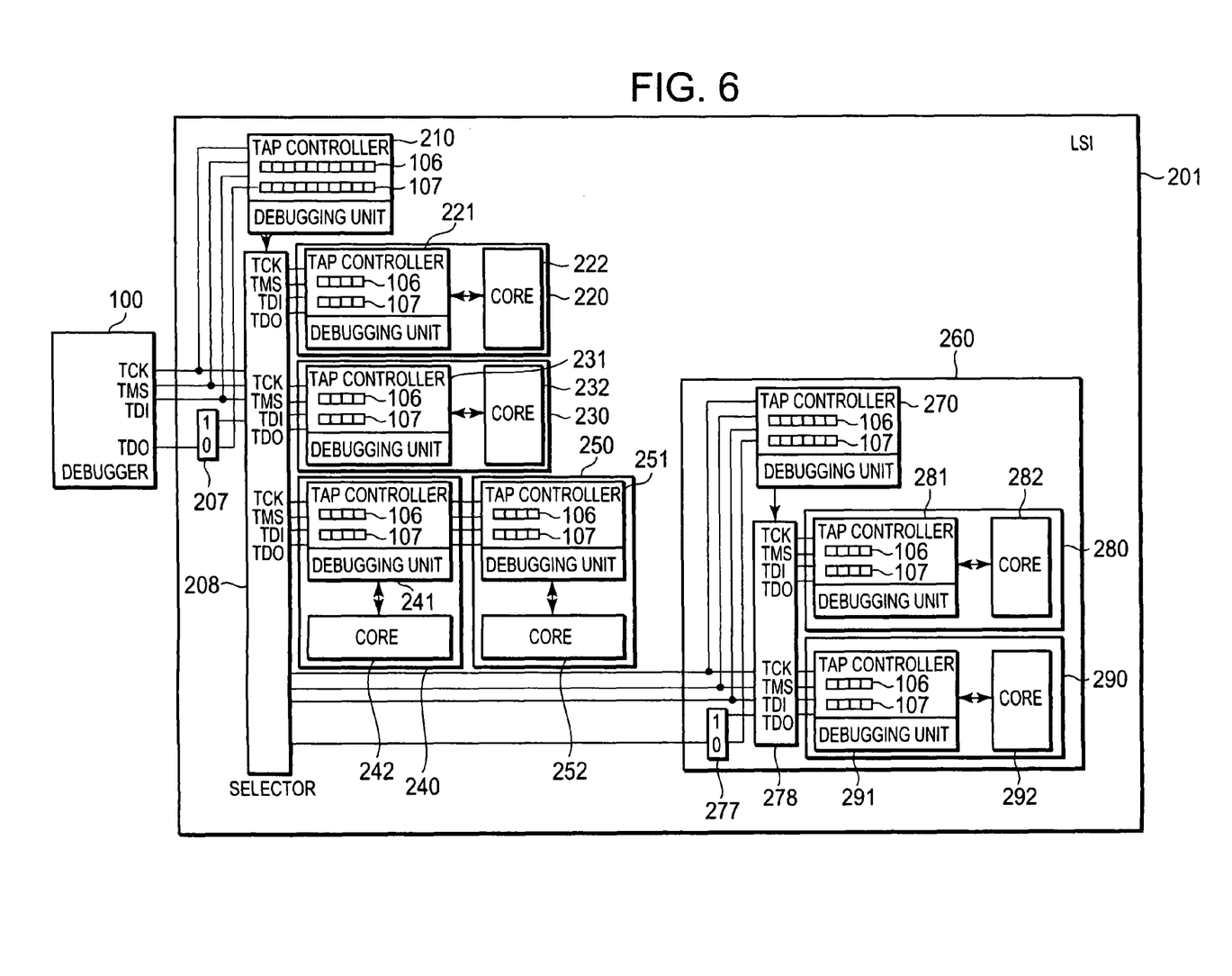
FIG. 6 is a block diagram of a multicore debugging system in a variation of the embodiment of the present invention.

FIG. 6 shows a block diagram of the system in a variation of this embodiment. As shown in FIG. 6, a chip 201 connected to the debugger 100 includes a primary TAP controller 210, selectors 207 and 208, and processor cores 220, 230, and 240 just like in the above embodiment. Furthermore, the processor core 240 is connected to a processor core 250 serially. And furthermore, the selector 208 is connected to a lower hierarchical layer unit 260 in parallel just like the processor cores 220, 230, and 240. The lower hierarchical layer unit 260 includes a primary TAP controller 270, selectors 277 and 278, and processor cores 280 and 290 just like the TAP controllers in the upper hierarchical layer.

And just like the primary TAP controller 210, the primary TAP controller 270 receives the IR code for selection from the connected debugger. Consequently, the primary TAP controller 270 selects the corresponding DR register and outputs a control signal to the selector 278 so as to select the object processor core. The selector 278 thus connects the debugger 100 to the processor core 280 or 290 according to this control signal. The selected processor core debugs the CPUs 282 and 292 under the control of the debugger 100 just like the processor cores 220, 230, and 240 in the upper hierarchical layer.

In this embodiment, it is premised that each of the secondary TAP controllers 221, 231, 241, 251, 281, and 291 interprets 4-bit IR codes. The secondary TAP controllers 241 and 251, which are serially connected to the debugger, respectively, input 8-bit IR codes, respectively. Furthermore, the secondary TAP controllers 281 and 291 in the lower hierarchical layer, which are connected to the debugger in parallel, input 4-bit IR codes, respectively. In this case, the primary TAP controller 270 can input IR codes having a length of 4+2=6 bits in minimum, respectively while the primary TAP controller 210 can input IR codes having a length of 8+2=10 bits in minimum, respectively.

It is also premised here that the bypass instruction assigned to the primary TAP controller 210 is an IR code in which all the upper-order 8 bits are "1" and the lower-order 2 bits are "00" or "11" among the 10-bit IR codes interpreted by the primary TAP controller 210. The bypass instruction assigned to the primary TAP controller 270 is an IR code in which all the upper-order 4 bits are "1" and the lower-order 2 bits are "00" or "11" among the 6-bit IR codes interpreted by the primary TAP controller 270. And the IR code for selection assigned to the primary TAP controller 210 is an IR code in which the upper-order 8 bits are all "1" and the lower-order 2 bits are "01" among the 10-bit IR codes interpreted by the primary TAP controller 210. If the processor core 220 is selected according to this IR code for selection, the same 10-bit IR code for selection is also inputted to the precedingly selected, for example, the secondary TAP controller 231 of the processor core 230. However, the lower-order 6 bits are shifted out from the IR shift register provided in the secondary TAP controller 231. On the other hand, because the upper-order 4 bits left over in the IR shift register are all "1", the secondary TAP controller 231 regards the bit string as a bypass instruction and executes the instruction.

If the above-described 10-bit IR code for selection is inputted to the processor core 240, the lower-order 6 bits of the 10-bit IR code are shifted out from the IR shift register of the secondary TAP controller 241 and the upper-order 4 bits left over in the IR shift register become all "1". Consequently, the secondary TAP controller 241 recognizes the IR code as a bypass instruction upon capturing it from the IR shift register into the state of Update-IR. The bit string of the upper-order 6 bits shifted out from the IR shift register is inputted to the processor core 250. The lower-order 2 bits of the 6 bits are then shifted out from the IR shift register provided in the secondary TAP controller 251. Consequently, the 4 bits left over in the IR shift register of the secondary TAP controller 251 become all "1". As a result, the secondary TAP controller 251 recognizes the IR code as a bypass instruction.

If the above-described 10-bit IR code for selection is inputted to the lower hierarchical layer unit 260, the lower-order 4 bits of the 6 bits in the IR code are shifted out from the IR shift register provided in the primary TAP controller 270. This is because the primary TAP controller 270 interprets only 6-bit IR codes. In this case, the upper-order 6 bits in the 10-bit IR code for selection are all "1", so that the primary TAP controller 270 recognizes the 6-bit IR code as a bypass instruction.

It is also premised here that the primary TAP controller 210 executes the 10-bit IR code for selection and the selector 208 selects the lower hierarchical layer unit 260, then the debugger 100 sends a 6-bit IR code for selection to the primary TAP controller 270 of the lower hierarchical layer unit 260. In this case, it is also premised that the lower-order 2 bits are neither "00" nor "11" in the IR code for selection assigned to the primary TAP controller 270. Upon receiving the 6-bit IR code for selection, the primary TAP controller 270 outputs a corresponding control signal to the selector 278. The selector 278 then selects, for example, the processor core 290 according to the control signal. In this case, although the 6-bit IR code for selection is inputted to the processor core 280 selected precedingly by the selector 278, the lower-order 6 bits are shifted out from the IR shift register provided in the secondary TAP controller 281 and the upper-order 4 bits are left over in the IR register. The 4 bits left over in the IR shift register are all "1", so that the secondary TAP controller 281 captures the bit string of the 4 bits into the IR register from the IR shift register in the state of Update-IR and recognizes the bit string as a bypass instruction.

In this embodiment, the IR codes assigned to the primary TAP controller are defined as extended bypass register access codes (all bits "1") conforming to the JTAG standard. Thus each IR code assigned to the primary TAP controller is recognized as a bypass register access code with respect to the object processor core. Consequently, it is assured that no unintentional FTAG instructions are executed for each processor core.

Furthermore, the primary TAP controller recognizes the IR codes output to each processor core as bypass accesses. This is why it is assured that no unintentional JTAG instructions are executed for the primary TAP controller. As a result, the ICE debugger, etc. that do not correspond to the primary TAP controller can also be used just like in a system that is not provided with such a primary TAP controller.

While the preferred form of the present invention has been described, it is to be understood that modifications will be apparent to those skilled in the art without departing from the spirit of the invention.

It is apparent that the present invention is not limited to the above embodiments, but may be modified and changed without departing from the scope and spirit of the invention.

What is claimed is:

1. A semiconductor integrated circuit, comprising:
a pin configured to receive an input bit sequence indicating one of instructions including a bypass instruction defined by a predetermined bit sequence;
a functional block performing a predetermined operation thereof;
another functional block performing a predetermined operation thereof;
a controller coupled to said pin and said functional block to receive said input bit sequence from said pin, and having a first instruction shift register for storing a bit sequence having an m+n bit length, said first instruction shift register storing a default bit sequence, said default bit sequence being written thereinto as a default value, said input bit sequence being written into said first instruction shift register subsequent to said default bit sequence and said default bit sequence being shifted out,
wherein said controller interprets a first bit sequence having the m+n bit length as an instruction for said controller, said first bit sequence being stored in said first instruction shift register as a result of writing said input bit sequence thereinto; and
another controller coupled to said pin and said another functional block to receive said input bit sequence from said pin in parallel with said controller, and having a second instruction shift register capable of storing a bit sequence having m bit length, said input bit sequence being written into said second instruction shift register,
wherein said another controller interprets a second bit sequence having an m bit length as an instruction for said another controller, said second bit sequence being stored in said second instruction shift register as a result of writing said input bit sequence thereinto,
wherein said controller interprets said first bit sequence not to perform any processing for said functional block, if said first bit sequence indicates a bypass instruction of m+n bits, or if m bits from a most significant part of said first bit sequence indicate a bypass instruction of m bits and n bits from a least significant part of said first bit sequence indicates residual bits of the default bit sequence which is not shifted out from said first instruction shift register, or if m bits from said most significant part of said first bit sequence indicates other than said bypass instruction of m bits,
wherein said controller interprets said first bit sequence to perform a processing for said functional block, if m bits from said most significant part of said first bit sequence indicate said bypass instruction of m bits and n bits from said least significant part of said first bit sequence does not indicate said residual bits, wherein said another controller interprets said second bit sequence not to perform any processing for said another functional block, if said second bit sequence indicates said bypass instruction of m bits, and wherein said another controller interprets said second bit sequence to perform a processing for said another functional block, if said second bit sequence does not indicate said bypass instruction of m bits.

2. The semiconductor integrated circuit according to claim 1, wherein said functional block comprises a selector, and said another functional block comprises a processor core.

3. The semiconductor integrated circuit according to claim 1, wherein each of said controller and said another controller comprises Test Access Port (TAP) controllers operating in compliance with a Joint Test Action Group (JTAG) standard.

4. The semiconductor integrated circuit according to claim 2, wherein said another controller is coupled to said selector.

5. The semiconductor integrated circuit according to claim 1, wherein said functional block comprises a selector, and said another functional block comprises another selector.

6. The semiconductor integrated circuit according to claim 1, further comprising:
a further functional block performing a predetermined operation thereof,
a further controller coupled to said another selector and said further functional block to receive said input bit sequence from said pin in parallel with said controller, and having a third instruction shift register capable of storing a bit sequence having an m−2 bit length as an instruction for said further controller, said input bit sequence being written into said third instruction shift register, wherein said further controller interprets a third bit sequence having the m−2 bit length as an instruction for said further controller, said third bit sequence being stored in said third instruction shift register as a result of writing said input bit sequence therein, wherein said second instruction shift register of said another controller stores said default bit sequence, said default bit sequence being written thereinto as a default value, said input bit sequence being written into said second instruction shift register subsequent to said default bit sequence and said default bit sequence being shifted out, wherein said further controller interprets said third bit sequence not to perform any processing for said further functional block, if said third bit sequence indicates a bypass instruction of m−2 bits, and wherein said further controller interprets said third bit sequence to perform a processing for said further functional block, if said third bit sequence does not indicate said bypass instruction of the m−2 bits.

7. The semiconductor integrated circuit according to claim 5, wherein said input bit sequence is inputted to said pin by a debugger coupled to said pin.

8. The semiconductor integrated circuit according to claim 1, wherein each of the bits defining said bypass instruction is 1.

* * * * *